March 25, 1952 R. F. EDGAR 2,590,761
BEARING
Filed March 17, 1948 2 SHEETS—SHEET 1
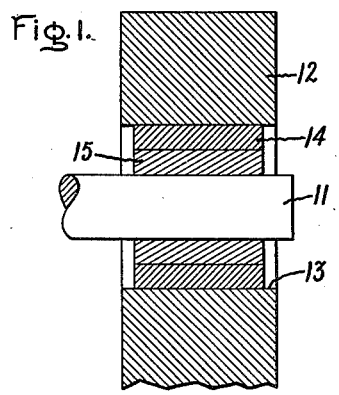
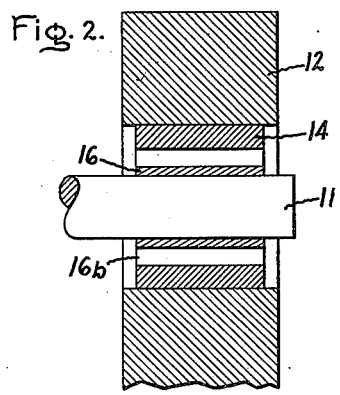
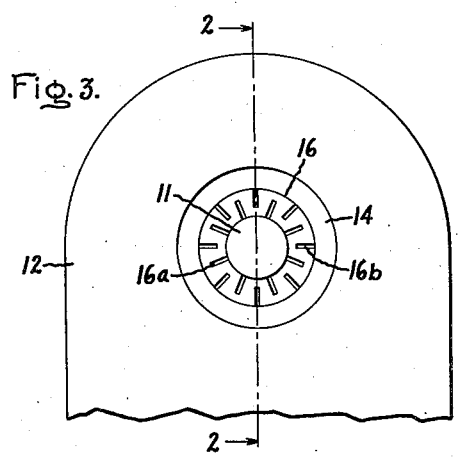
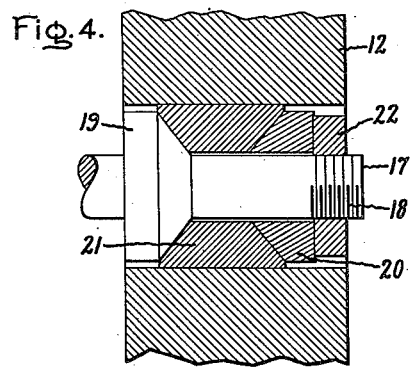
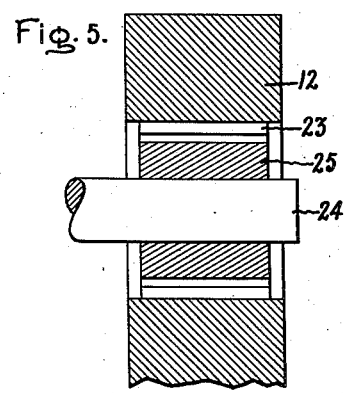
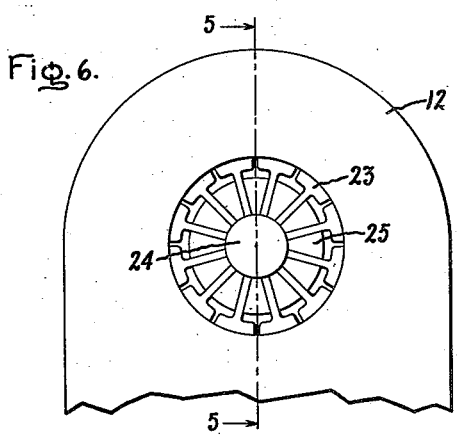
Inventor:
Robert F. Edgar,
by *Crowell S. Mack*
His Attorney.

March 25, 1952 R. F. EDGAR 2,590,761
BEARING
Filed March 17, 1948 2 SHEETS—SHEET 2
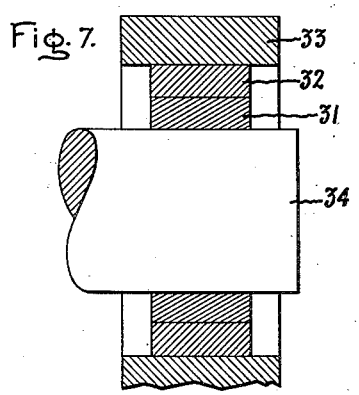
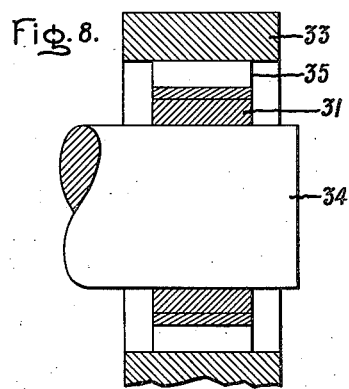
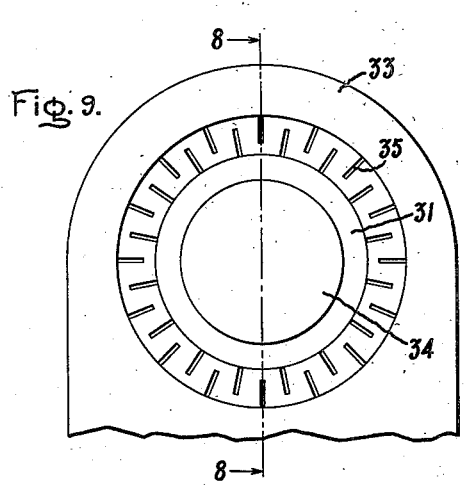
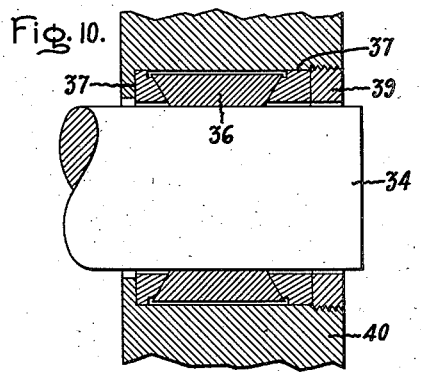
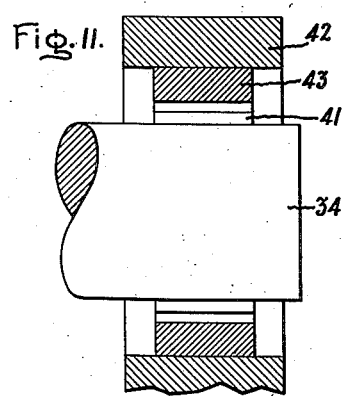
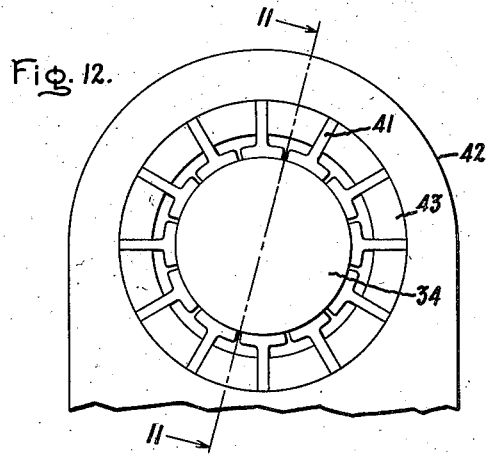
Inventor:
Robert F. Edgar,
by His Attorney.

Patented Mar. 25, 1952

2,590,761

UNITED STATES PATENT OFFICE 2,590,761

BEARING

Robert F. Edgar, Pattersonville, N. Y., assignor to General Electric Company, a corporation of New York Application March 17, 1948, Serial No. 15,389

4 Claims. (Cl. 308—237)

This invention relates to improvements in bearings and more particularly to arrangements for bearings utilizing a bearing surface material which has a substantially different coefficient of thermal expansion than that of the material to which it is attached.

The invention is particularly applicable in connection with a bearing comprising a molded body of a cemented carbide material having a very high melting point, such as cemented tungsten carbide often known to the trade as "Carboloy." Because of its great wear resistance it is often desirable to use such a material as one or both of two mating bearing surfaces for high speed operation, as in a high speed automatic grinding wheel assembly where wear must be kept at a minimum to insure accuracy and a fine finish on the product being ground. When such a cemented carbide body is attached to a mounting of an ordinary metal, such as steel, certain difficulties arise in that the coefficient of thermal expansion is different for the two materials so that there is a tendency for one of the materials to buckle or split or for the binding to separate with any change in temperature. It is often desirable to make a cemented carbide journal in the form of a bushing attached to a steel shaft in order to avoid the expense of a shaft made of solid cemented carbide. If the bushing is brazed or soldered to the shaft, and the inner diameter of the bushing is the correct diameter to fit over the shaft at brazing or soldering temperatures, the shaft will shrink away from the bushing upon cooling and seriously weaken the joint. If instead of brazing or soldering, the bushing is fitted to the steel shaft with a press fit tight enough for minimum temperatures it may split at operating temperatures, since the cemented carbides are relatively weak in tension; or if it does not split it may be stretched enough to appreciably alter the running clearance between the journal and the bearing. The cemented carbides are used to best advantage in bearings of very small running clearance, and stretching of the journal bushing may be sufficient to eliminate this clearance entirely and cause the bearing to seize.

It is an object of my invention to provide simple means for overcoming the above-mentioned difficulties.

It is a further object of my invention to provide an improved bearing construction comprising cemented tungsten carbide for at least one of two bearing surfaces together with means for compensating for the difference in thermal expansion between the cemented tungsten carbide and the material to which it is attached.

It is a still further object of my invention to provide a high speed precision bearing using a cemented carbide secured to steel and having an inherent allowance for the relative difference in the coefficient of expansion of the carbide material and the steel.

Further objects and advantages of the invention will appear and my invention will be better understood from consideration of the following description taken in connection with the accompanying drawing. In the drawing Fig. 1 is a side elevational view showing a journal bearing surface indirectly attached to a shaft; Fig. 2 is a side elevational view of another embodiment in which a journal bearing surface is indirectly secured to a shaft; Fig. 3 is an end view of the construction shown in Fig. 2; Fig. 4 is a side elevational view of another embodiment in which a journal bearing surface is indirectly secured to a shaft; Fig. 5 is a side elevational view of still another embodiment in which a journal bearing surface is indirectly secured to a shaft; Fig. 6 is an end view of the construction shown in Fig. 5; and the remaining figures are corresponding views but with each journal shown as a large shaft assumed, for simplicity, to be of steel and the mating bearing surface shown indirectly secured to an outer bearing housing. It will be seen that, with this difference, Fig. 7 corresponds to Fig. 1, Fig. 8 corresponds to Fig. 2, etc.

Referring now to Fig. 1, I have shown a rotatable shaft 11, which may conveniently be made of steel. The shaft 11 is located within and concentric with a bearing 12. The inner periphery 13 of the bearing 12 acts as a bearing surface. The bearing 12, and therefore, the bearing surface 13, may be of any materal (such as a carbide), but for simplicity in description is assumed to be steel. The inner bearing or journal surface is provided by a cylindrical bushing 14 of a refractory carbide material, such as cemented tungsten carbide. In order that bushing 14 will be rotatable with shaft 11, and, at the same time, allowance will be made for the differential between the expansion of steel shaft 11 and that of bushing 14 with temperature changes, a sleeve 15 of a low expansion metal, such as Invar, is used between these parts. The Invar sleeve 15 is tightly pressed over the shaft and the bushing 14 is pressed over the Invar. The thermal coefficient of expansion of cemented tungsten carbide is about one half that of steel so that by choosing the correct proportion of Invar to steel the net expansion (at the outer periphery of the Invar) may be made equal to that which the cemented tungsten carbide bushing assumes naturally. As the steel shaft expands with increased temperature, the sleeve of Invar (or other low expansion metal) will not expand naturally the same amount and has to stretch circumferentially. This circumferential stretching tends to reduce the radial thickness of sleeve 15 in the same way that a rubberband is reduced in thickness when stretched. Of course, it is assumed that the device will not be used at a temperature greater than that required to stretch the Invar to its elastic limit as it would not then return to its original size on cooling.

In Fig. 2, I have shown another method for compensating for the difference in the thermal expansion coefficient of the journal material and that of the shaft to which it is indirectly secured. In Fig. 2 the journal material, assumed of cemented tungsten carbide fashioned into a bushing 14, is secured to shaft 11 by an Invar sleeve 16 which is cut with radial slots (such as 16b) extending the length of the sleeve. As is more clearly shown in Fig. 3, it is preferable to have half the slots (16a) extending from the inside nearly to the outside of the sleeve and half the slots (16b) extending from the outside nearly to the inside. These slots permit free circumferential expansion of the Invar without stretching so that there is no reduction in its radial thickness upon heating of shaft, sleeve, and bushing. By properly proportioning the Invar and the steel, the net expansion of the outer diameter of the Invar can be made equal to that required by the slight expansion of the cemented tungsten carbide bushing 14. This construction is not limited by the elastic limit of the Invar, but the constructions of both Fig. 1 and Fig. 2 are limited to the temperature range over which the coefficient of expansion of the Invar retains its very low value.

In Fig. 4, I have shown other means for securing a journal material to a shaft where the journal material and the shaft have a substantially different coefficient of thermal expansion. The shaft 17 is provided with threads 18 at one end thereof and, in spaced relation to accommodate the final assembly, a conical shaft shoulder 19 which may be an integral part of the shaft. Another conical shoulder 20 is slidably arranged on the shaft. The conical surfaces of the shoulders mate with the ends of a bushing 21 which has a trapezoidal cross section. It is preferable to make the angle of the conical surfaces such that the tips of the cones, if extended, would just meet at the center of the bushing. The conical shoulders are locked against the bearing bushing by means of a nut 22 as it is drawn up on the shaft threaded portion 18 to lock the assembly against the shaft shoulder 19. Bushing 21 may conveniently be made of cemented tungsten carbide and all the other parts of steel. With temperature change, the shaft expands radially but it expands a like amount axially. With the construction of Fig. 4, this axial expansion will compensate for the radial expansion, the conical surfaces will move only along their mating surfaces and there will be no change in fit of the cemented tungsten carbide bushing 21. This is so even though bushing 21 itself expands, for it too will expand axially at the same time that it expands radially and tightness of fit will be independent of expansion of the members.

In Fig. 4 the clearance between shoulder 20 and shaft 18 is exaggerated for purposes of clarity.

In Figs. 5 and 6, I have shown other means for allowing free circumferential expansion of a steel shaft without cracking or changing the fit of a cemented tungsten carbide journal. The cemented tungsten carbide is formed into a plurality of bars 23 (see Fig. 6) which are fastened to the steel shaft 24 at one end and at the other end are shaped somewhat like the teeth of dynamoelectric machine rotor punchings being flanged outwardly at their outer ends to provide a narrow slot at the bearing surface and a larger space between the teeth at the bottom and middle of the slot. Into the spaces between the teeth 23, a metal 25 having a large expansion coefficient, such as copper, is placed to compensate for the smaller coefficient of the cemented tungsten carbide giving a net circumferential expansion (of carboloy and copper immediately surrounding the shaft) equal to that of the steel shaft itself. The constructions of Figs. 5 and 6 do not provide for absorbing radial expansion, but are suitable where a material of greater coefficient is used for the stationary bearing surface (so that the running clearance will be independent of temperature); where the running clearance is so large that slight changes are not troublesome; or where the construction shown in Fig. 12, described below, is used for the bearing.

It will be seen that the construction shown in Fig. 7 is identical with that shown in Fig. 1 except that it is applied to the mounting of bushing 31 (of a low-coefficient bearing material) in a steel housing 33, instead of to the mounting of a journal bushing on a shaft. A sleeve 32 is placed between the bushing 31 and the steel bearing housing 33. The shaft 34 itself forms the inner bearing or journal surface. With this construction the intermediate sleeve material 32 has to have a greater coefficient than either the hard bearing metal (which may be cemented tungsten carbide) or the steel housing. Copper or aluminum will be found useful for this application and it will be assumed that sleeve 32 is of copper. The cemented tungsten carbide is characterized by a high compressive strength which will be sufficient to stretch this intermediate copper upon cooling. Both the carbide in compressive strength and the outer steel housing in tensile strength can be made strong enough to cause some plastic flow of the intermediate copper in sleeve 32.

Fig. 8 is comparable to Fig. 2 although the hard material of the bushing 31 forms the bearing surface and the shaft 34 forms the journal surface. Interposed between bushing 31 and the outer housing 33 is a sleeve 35, which may conveniently be made of copper or aluminum, and which is provided with radial slots similar to the sleeve 14 of Fig. 2. Fig. 9 is an end view of the construction shown in Fig. 8.

In Fig. 10 the shaft 34 forms a journal surface and the bearing surface is formed by a bushing 36 of hard material. This bushing has a trapezoidal cross section and its ends are designed to mate with conical surfaces of shoulders 37 which are held in place by an integrally threaded nut 39 which is screwed into the outer housing 40. The operation of the construction shown in Fig. 10 is substantially the same as that of the construction shown in Fig. 4.

In Figs. 11 and 12, I have shown a bearing surface provided by a plurality of teeth 41 attached to an outer housing 42 as by brazing. The inside peripheral surface of the teeth are ground or otherwise formed into a true cylinder. The copper brazing 43 is carried down between the teeth, or in some other manner the thickness of copper between the teeth is made such that its greater expansion coefficient will compensate for the small one of the hard bearing material (such as cemented tungsten carbide) to give a net circumferential expansion equal to that required by the steel outer housing.

By thus compensating for the expansion differential between a hard bearing material (such as cemented tungsten carbide) and steel, tightness of fit is assured regardless of heating. Thus bearings may be made having extremely small clearances on the order of 0.0001" difference in diameter in a ¾" diameter bearing. Bearings of such small clearances running at high speed require a lubricant of low viscosity and I have found water useful as such a lubricant. If desired, suitable wetting agents can be added to the water to promote wetting of the carbide surfaces.

There is thus provided means for meeting the objects hereinabove set forth.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the true spirit and scope of my invention.

What I claim as new and desire to secure by Letters Patent of the United States is:

1. A sleeve bearing assembly comprising a steel shaft, a molded journal of cemented tungsten carbide, an outer bearing member, the inner periphery of said bearing member and the outer periphery of said cemented tungsten carbide journal forming mating bearing surfaces, and means including a separate sleeve interposed between said cemented tungsten carbide journal and said shaft to allow for the differential of temperature expansion of said journal and said shaft said sleeve comprising a material having a thermal expansion coefficient less than that of the material of said shaft and less than that of said cemented tungsten carbide journal.

2. A sleeve bearing assembly comprising an outer housing having an inner periphery adapted to form one bearing surface, a molded bushing of carbide material having an outer periphery adapted to form a mating bearing surface, a steel shaft located within said molded bushing, and a sleeve of a metal having a thermal expansion coefficient lower than that of steel, said sleeve being interposed to form a driving connection between said molded bushing and said shaft and to support said shaft on said mating bearing surfaces.

3. A sleeve bearing assembly comprising, a molded body of carbide material having an outer periphery adapted to form a journal surface, a steel shaft located within said molded body, and a sleeve of Invar interposed between said molded body and said shaft, said Invar sleeve being provided with slots extending radially less than the radial thickness of said sleeve.

4. A sleeve bearing assembly comprising a steel shaft, a sleeve of Invar tightly pressed thereon to be rotatable with said shaft, a molded body of carbide material tightly pressed over said sleeve to be rotatable therewith, said molded body having an outer periphery adapted to form a journal-bearing surface, and an outer housing having an inner periphery adapted to form a mating bearing surface for supporting said shaft.

ROBERT F. EDGAR.

REFERENCES CITED

The following references are of record in the file of this patent:

UNITED STATES PATENTS

| Number | Name | Date |
|---|---|---|
| 2,027,787 | Ridgeway | Jan. 14, 1936 |
| 2,027,788 | Ridgeway | Jan. 14, 1936 |
| 2,413,989 | Molner | Jan. 7, 1947 |

OTHER REFERENCES

Machinery, page 148, Nov. 1945.